UNITED STATES PATENT OFFICE.

MATHIAS PIER, OF ZEHLENDORF-BERLIN, GERMANY, ASSIGNOR, BY MESNE ASSIGNMENTS, TO DYNAMIT-ACTIEN GESELLSCHAFT, OF HAMBURG, GERMANY.

METHOD FOR THE PREPARATION OF AMMONIA FROM THE ELEMENTS.

1,119,534.      Specification of Letters Patent.      Patented Dec. 1, 1914.

No Drawing.      Application filed October 5, 1912. Serial No. 724,035.

*To all whom it may concern:*

Be it known that I, MATHIAS PIER, of Burggrafenstrasse 20, Zehlendorf-Berlin, in the Empire of Germany, have invented certain new and useful Improvements in Methods for the Preparation of Ammonia from the Elements, and do hereby declare that the following is a full, clear, and exact description thereof.

My invention relates to a process for the preparation of chemical compounds by means of catalytic agents, but it has special reference to the preparation of ammonia in this manner from its elements.

The object of my invention is to provide a process of the above character in which the union of the elements may be effected in a short time, and in which the highest possible percentage of the compound to be formed may be obtained at the lowest possible temperature and pressure, and without the necessity of interrupting the operation of the process.

A number of substances have been previously suggested as catalytic agents for this purpose such, for example, as osmium, uranium, elements of the iron group mixed with alkali, alkaline earths or earths, molybdenum, cerium with alkali, osmium, with potassium osmiate, barium with potassium nitrate, thorium or aluminum with potassium nitrate, pure iron, manganese, and tungsten. Of these various substances, osmium gives the best results. I have discovered that another substance never before used for this purpose gives even better results than osmium, which gave the best results previously obtainable. The element ruthenium has been found especially advantageous as a catalytic agent when used either uncombined or in the form of salts of its higher oxygen compounds. In the case where ruthenium compounds are used potassium ruthenate

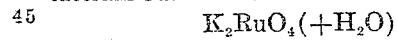

or potassium perruthenate

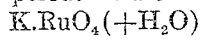

may be used or instead ruthenium chlorid may be used when mixed with alkalis or earth alkalis or carbonates of the elements of both said groups. Furthermore, ruthenium hydroxid may be used when prepared by precipitating from the aqueous ruthenium chlorid solution the hydroxid $Ru(OH)_3$, removing the hydrochloric acid by means of washing and finely distributing the ruthenium hydroxid produced over alkaline contact carriers.

By the use of my new catalytic agent at a temperature of 450° C., and under a pressure of only 80 atmospheres, a gas mixture containing 11 to 12 per cent. of ammonia by volume can be regularly obtained. Inasmuch as the yield of ammonia increases approximately in proportion to the pressure utilized, a yield of 20% by volume should be obtained with a total pressure of 175 atmospheres. Investigations upon the use of osmium show that a gas mixture of only 8% ammonia by volume can be obtained with a pressure of 175 atmospheres when using osmium as the catalyzing agent. It will thus be seen that the results obtained by the use of ruthenium and its compounds are far superior to those obtained by the best catalytic agents previously known.

While I have described my invention above in detail, I wish it to be understood that many changes may be made therein without departing from the spirit thereof.

I claim:

1. The method of producing ammonia which comprises treating a mixture of nitrogen and hydrogen with a catalytic agent containing ruthenium.

2. The method of producing ammonia which comprises treating a mixture of nitrogen and hydrogen with a catalytic agent comprising a salt containing ruthenium.

3. The method of producing ammonia which comprises treating a mixture of nitrogen and hydrogen with a catalytic agent containing ruthenium, while the mixture treated is under increased temperature and pressure.

4. The method of producing ammonia which comprises treating a mixture of nitrogen and hydrogen with a catalytic agent comprising a salt containing ruthenium, while the mixture treated is under increased temperature and pressure.

In testimony that I claim the foregoing I have hereunto set my hand.

MATHIAS PIER.

Witnesses:
     HENRY HASPER,
     WOLDEMAR HAUPT.